UNITED STATES PATENT OFFICE.

WILLIAM H. DE VALIN, OF SAN RAFAEL, CALIFORNIA.

IMPROVEMENT IN TREATING BRICKS FOR PAVEMENTS.

Specification forming part of Letters Patent No. 144,749, dated November 18, 1873; application filed October 28, 1873.

*To all whom it may concern:*

Be it known that I, WILLIAM H. DE VALIN, of San Rafael, county of Marin and State of California, have invented certain new and useful Improvements in Treating Bricks and other materials for paving and other purposes, of which the following is a specification:

Many attempts have been made to combine coal-tar, asphaltum, and other hydrocarbons with other material for paving and other purposes, the hydrocarbon being used to cement the particles of the substance used; but, owing to the difficulty in mixing the proper proportions, and the sensitiveness of the hydrocarbon to changes of temperature, the materials thus combined fail to maintain the requisite consistency under atmospheric changes.

To attain the desired end, I use clay or other suitable substance made of plaster and molded into bricks or blocks of the desired size and form, which are first dried or baked, and thoroughly saturated with the hydrocarbon by being placed in a suitable vessel and covered with liquid hydrocarbon to a depth sufficient to allow for absorption and evaporation; heat is then applied and maintained until the bricks or blocks are permeated, and the hydrocarbon boiled to such consistency that it will harden when cooled, which point is attained by the hydrocarbon absorbed by the bricks, as well as that portion of said hydrocarbon in which they are immersed, so that all parts of the bricks, interior as well as exterior, will be toughened and hardened. As much surplus material will adhere to the brick when being removed, by reason of the hydrocarbon being thickened and rapidly cooling, the vessel may be provided with two outlets, connecting with separate receptacles, one outlet being used to draw off the remaining hydrocarbon into one of the receptacles before removing the bricks. Boiling water may then be let into the vessel, and kept at the boiling-point until the bricks are removed; and it can then be drawn off through the other outlet (the first having been closed) into the other receptacle, when the hydrocarbon will settle to the bottom, and the water may be separated therefrom. Steam may be employed by fitting a tight cover to the vessel, and letting in the steam through a suitable pipe, and allowing it to escape through the outlet, the volume being kept up until the bricks are sufficiently cleaned. The volatile portion of the hydrocarbon may be saved and utilized by a proper arrangement of appliances.

By this process I combine the natural solidity of the bricks or blocks with the cementing qualities of hydrocarbon, producing a material which will sustain weight and resist abrasion. The hydrocarbon by this treatment can be reduced to greater density and combined with the other material more evenly than by any other process, enabling it to withstand higher temperature. Blocks or bricks thus prepared are specially adapted for paving, but may be used for other purposes, among which are cisterns, aqueducts, and walls for fortifications when laid with asphalt.

I have particularly described the process as applied to substances susceptible of being molded, but porous stones may be treated in the same manner.

Having described my invention, what I claim, and desire to secure by Letters Patent, is—

The process of treating bricks or porous stone with coal-tar, asphalt, or other suitable hydrocarbon, by immersing the bricks in the hydrocarbon and boiling the two together until the hydrocarbon contained by and surrounding the bricks has the consistency specified, as and for the purposes described.

In testimony whereof I have signed my name to this specification before two subscribing witnesses.

WILLIAM H. DE VALIN.

Witnesses:
WILLIAM FIRDERER,
PHILIP CADUC.